United States Patent [19]
Ficken

[11] Patent Number: 5,344,050
[45] Date of Patent: Sep. 6, 1994

[54] MOISTURE REDUCTION SYSTEM FOR AN AUTOMATIC VENDING MACHINE

[75] Inventor: Leonard A. Ficken, Manchester, Mo.

[73] Assignee: Unidynamics Corporation, Stamford, Conn.

[21] Appl. No.: 41,669

[22] Filed: Apr. 1, 1993

[51] Int. Cl.⁵ ............................................. B67D 5/56
[52] U.S. Cl. ........................ 222/129.4; 222/146.2; 222/148; 99/289 R
[58] Field of Search ................. 222/129.3, 129.4, 145, 222/189, 146.2, 146.5, 148; 312/213; 454/63, 65; 55/300, 304; 99/289 R

[56] References Cited

U.S. PATENT DOCUMENTS

| | | | |
|---|---|---|---|
| 3,300,094 | 1/1967 | Rockola | 222/129.4 |
| 3,591,888 | 7/1971 | Takeda | 55/300 X |
| 4,345,353 | 8/1982 | Sommerfeld | 55/304 X |
| 4,784,050 | 11/1988 | Cavalli et al. | 99/289 R |
| 5,133,016 | 10/1992 | Göckelmann | 99/289 R |
| 5,192,002 | 3/1993 | Reese et al. | 222/129.4 X |

*Primary Examiner*—Gregory L. Huson
*Attorney, Agent, or Firm*—Senniger, Powers, Leavitt & Roedel

[57] ABSTRACT

A moisture reduction system for an automatic vending machine of the hot beverage type which utilizes a movable brewing chamber that opens for the addition of product, such as coffee. The system has a suction tube disposed adjacent the product supply tube and brewing chamber in its product fill position, which draws off moisture from the open chamber so that it does not accumulate on the product supply tube. A filter is disposed at the end of the suction tube to prevent product dust, such as coffee grounds, from being sucked into the tube.

5 Claims, 5 Drawing Sheets

MOISTURE REDUCTION SYSTEM FOR AN AUTOMATIC VENDING MACHINE

The present invention relates to automatic vending machines and, more particularly, to those designed for brewing beverages such as coffee or tea. Automatic vending machines containing hot beverage brewers for brewing coffee and the like, have always been subject to moisture problems because of the use of hot water which, at various stages of the process, is open to atmosphere within the machine cabinet and therefore introduces steam into the cabinet. The presence of this moisture in the cabinet causes various problems with different aspects of operation and cleanliness of the equipment. One such moisture related problem is in the area where the ground coffee is introduced into the brewing chamber.

Finely ground coffee, whether ground in the machine at the time of selection by a customer or preground coffee kept in a container, is deposited in the brewing chamber through some form of conduit or funnel. When the machine is being operated to produce multiple cups of coffee, the brewing chamber, when first opened after a brewing cycle, contains a substantial amount of hot vapor which escapes the brewing chamber in the area of the conduit or funnel from which the subsequent charge of coffee is coming. The finely ground coffee picks up the moisture and a significant amount of the moist coffee adheres itself to the outlet opening of the duct or funnel, eventually clogging off flow of coffee to the chamber if the duct or funnel is not cleaned frequently. Since frequent servicing is expensive, it is desirable to reduce this clogging effect as much as possible.

SUMMARY OF THE INVENTION

The present invention substantially reduces the clogging of the ducts or funnels which pour the ground coffee and the like into the brewing chamber, by withdrawing a substantial amount of moisture from the area of the open brewing chamber and the outlets of the ducts or funnels, and disposes of accumulated coffee grounds in this area which might otherwise cause clogging. These advantages are achieved through the use of a suction tube with an opening disposed adjacent the opening in the brewing chamber and the product delivery conduit when they are in the position where product is being supplied to the brewing chamber. In addition, a filter is provided which covers the opening in the suction tube and entraps and accumulated the coffee grounds entrained in the flow of air into the suction tube while preventing these moist coffee grounds from passing into the tube itself. A wiper blade is also provided which is fixed for movement with the brewing chamber in such a manner that it scrapes the filter and removes a substantial portion of the accumulated moistened coffee grounds so that efficiency of the suction system is maintained in that the suction tube itself does not become clogged.

DETAILED DESCRIPTION OF THE PREFERRED EMBODIMENT

Figure 1:
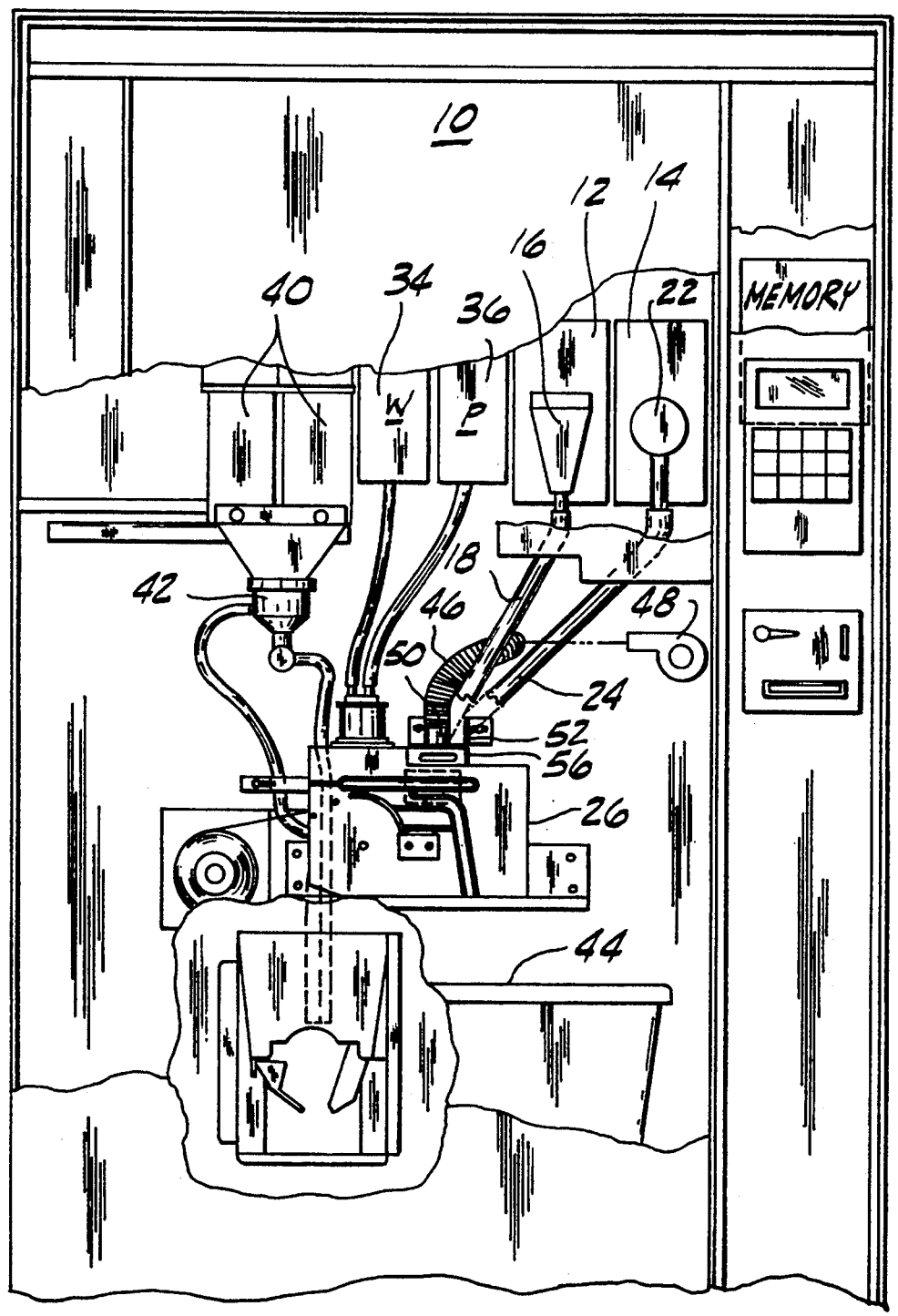
FIG. 1 is a front view of a vending machine partially cutaway to show internal components thereof.
Figure 2:
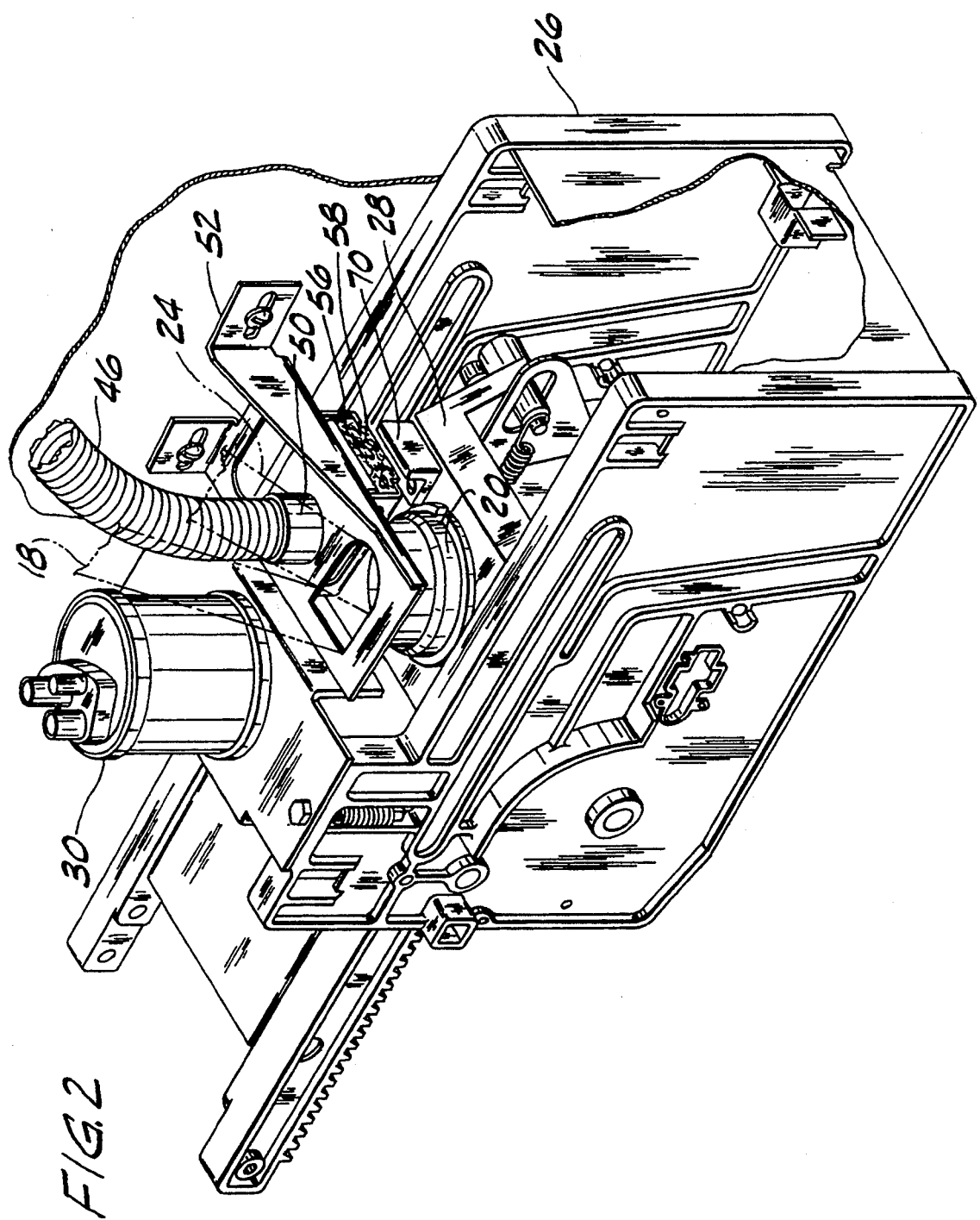
FIG. 2 is a pictorial view of the brewing system of the vending machine of FIG. 1 with other components shown.

A vending machine 10, as shown in FIG. 1, is of the type which brews hot beverages, such as coffee or tea, and is of the general type well known in the industry. Such vending machines 10 generally include a plurality of product dispensers such as, for example, a decaffeinated coffee dispenser 12 and a regular coffee dispenser 14. Either of these dispensers can provide either preground coffee or coffee beans which are ground each time a customer operates the equipment, if desired. In the embodiment shown in FIG. 1, the decaffeinated coffee dispenser 12 is shown as being provided with a funnel and a delivery tube or conduit 18 through which preground coffee is delivered from the dispenser 12 to the top of a brewing chamber 20, as best seen in FIG. 2. A metered amount of the preground coffee in the dispenser 12 is dispensed with an auger (not shown) in the bottom of the dispenser which places the proper amount of coffee grounds into the funnel 16. Likewise, the regular coffee dispenser 14 dispenses coffee beams into a grinder 22, shown in FIG. 1, from which the ground coffee is then distributed by the tube 24 into the brewing chamber 20, again, as best seen in FIG. 2.

Figure 3:
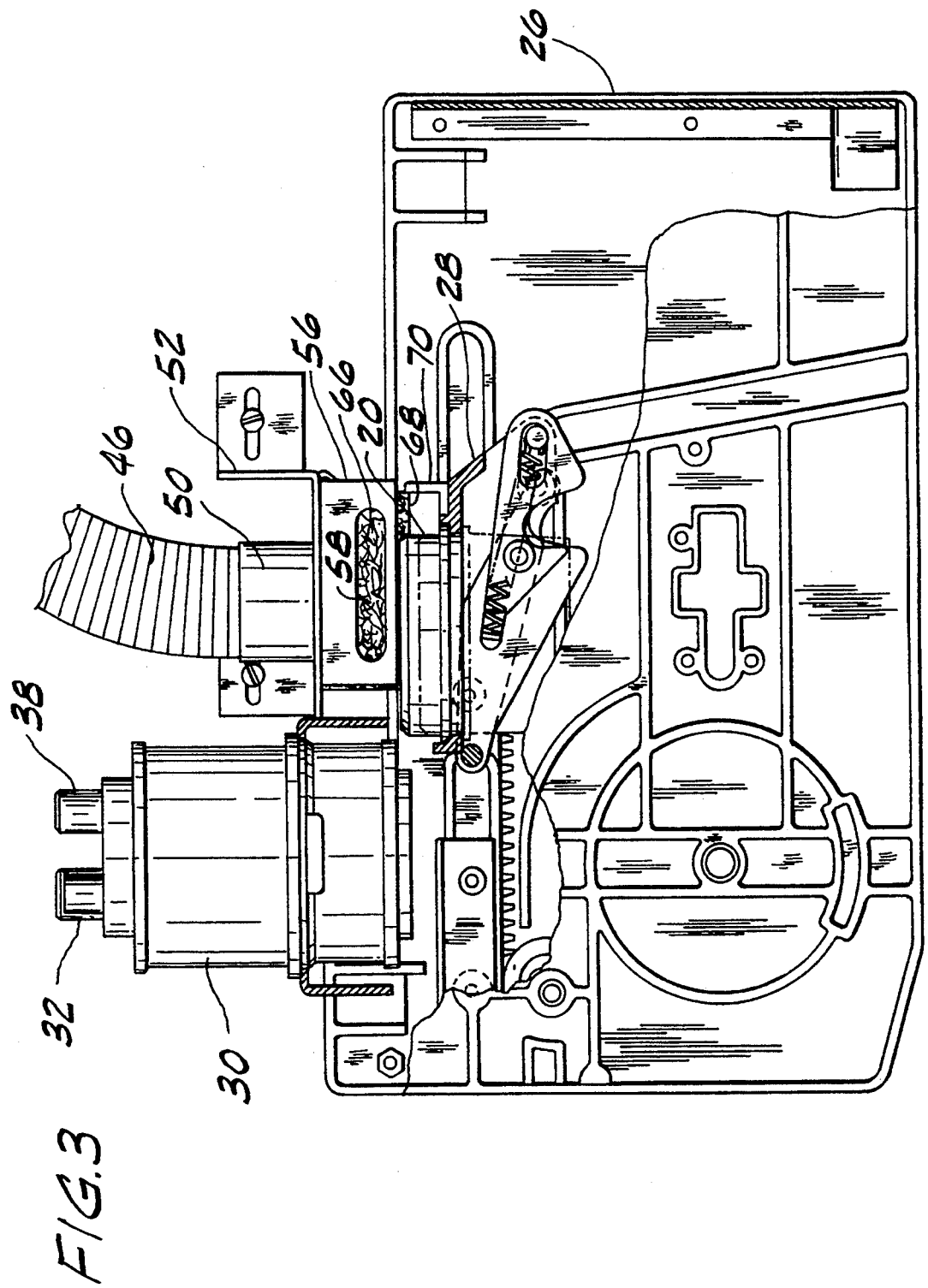
FIG. 3 is a side view of the brewing mechanism of FIG. 2 partially cutaway and with the brewing chamber in the product fill position.
Figure 4:
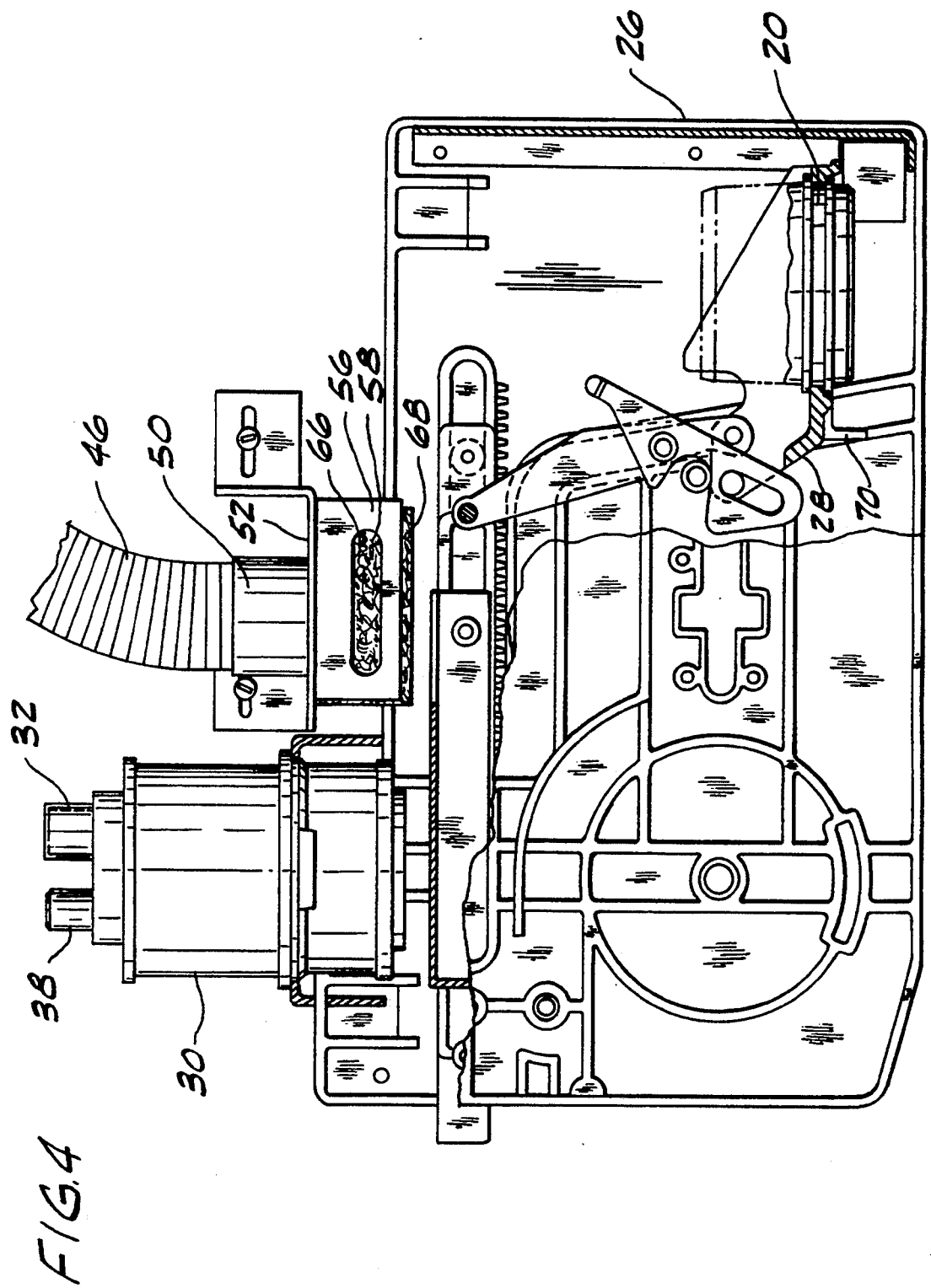
FIG. 4 is a view similar to FIG. 3, but showing the brewing chamber in the product dump position.

The brewing system is shown generally at 26 in FIG. 1 and in greater detail in FIGS. 2–4. A mechanism is provided and is partially illustrated in FIGS. 2–4, for cycling the brewing system through a product filling, brewing and dumping cycle. The details of operation of the mechanism, however, are not necessary to an understanding of the present invention, however, it operates essentially as disclosed in pending application Ser. No. 07/971,932, filed Dec. 1, 1992, entitled Dual Brewer for Tea and Coffee, now U.S. Pat. No. 5,265,518, incorporated herein by reference.

The brewing chamber 20 which is an open cylinder with a screen mounted in the lower portion thereof for holding the grounds while hot water is passed through them. The brewing chamber 20 is mounted to a platen 28 for movement therewith. As shown in FIGS. 2 and 3, the brewing chamber 20 and platen 28 are positioned in the product fill position beneath the tubes 18 and 24 for receiving ground coffee from either of these tubes at the beginning of the brewing cycle. This is the position the machine cycles to at completion of the vending operation and is the position in which its starts a new cycle.

After product has been dumped into the brewing chamber 20, via either tube 18 or 24, the brewing chamber 20 is then moved laterally to a position beneath the brewing chamber cap 30 and then upward into sealing engagement with the cap 30, as well as into sealing engagement with a base plate (not shown) which engages the bottom of the chamber 20 to seal off the entire brewing system for injection of hot water. Once hot water is introduced through an inlet port 32 from a water supply 34, as shown in FIG. 1, pressure is applied from a high pressure air reservoir 36 through tube 38 to eject the brewed coffee from the brewing system. The coffee is then subsequently mixed with other additives of condiments, such as dry creamer, sugar or sugar substitute, contained in various canisters 40 which are provided with a system that introduces the desired additives into the coffee via mixing bowls 42. This system of additive introduction to the brewed coffee is of only generally interest with respect to the present invention and forms no part thereof and therefore will not be described in more detail herein.

Once the coffee is ejected from the brewing chamber 20, the platen 28 is moved to the right, as shown in FIGS. 1-4, to the point where the chamber 20 is inverted, as shown in FIG. 4, so that the used product, i.e., coffee grounds, is ejected from the cup merely by the shock or vibration from the sudden stopping of the chamber 20 at the end of its track. The product is dumped into a waste container 44, shown in FIG. 1. After product is dumped from the brewing chamber 20, the platen is returned to its home position, as shown in FIGS. 2 and 3, beneath the tubes 18 and 24, where it is then ready for a subsequent brewing cycle.

The home position is where moisture or hot water vapors remaining in the brewing chamber 20 have created the problem in the past with respect to subsequent coffee grounds being distributed through the tubes 18 and 24 to the brewing chamber. The moisture which comes up out of the brewing chamber 20 tends to be attracted to the ends of the tubes 18 and 24 and, in turn, attracts coffee grounds which eventually clog the prior art machines. In order to overcome this, a suction tube 46 is provided by the present invention which has its remote end connected to a suction pump or blower 48, as shown in FIG. 1. The suction pump or blower 48, can be a simple squirrel cage or blade fan set up to create a suction within the tube 46.

Figure 5:
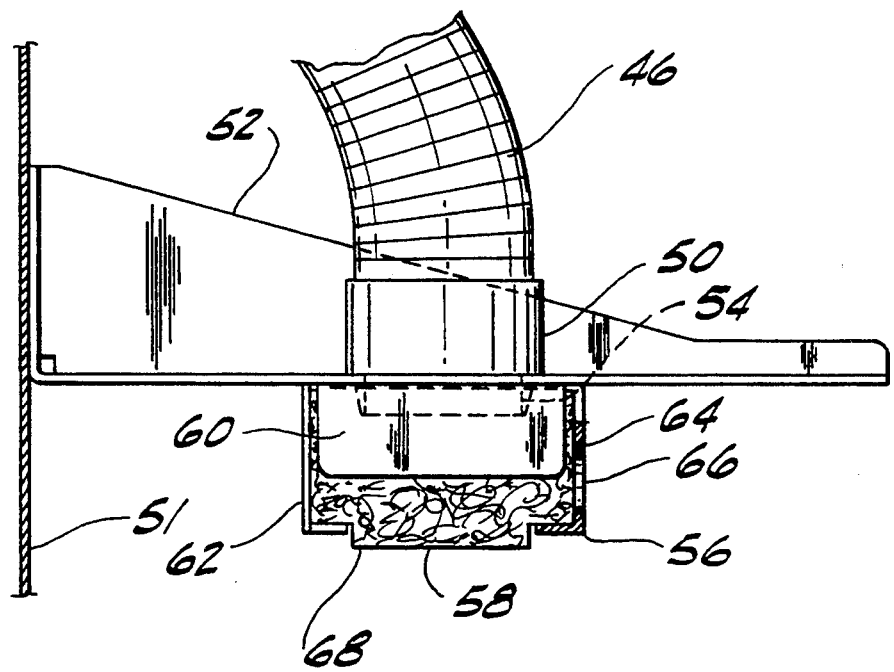
FIG. 5 is a side view of the suction tube and filter assembly of the preferred embodiment of the present invention mounted to a rear cabinet wall of the vending machine.
Figure 6:
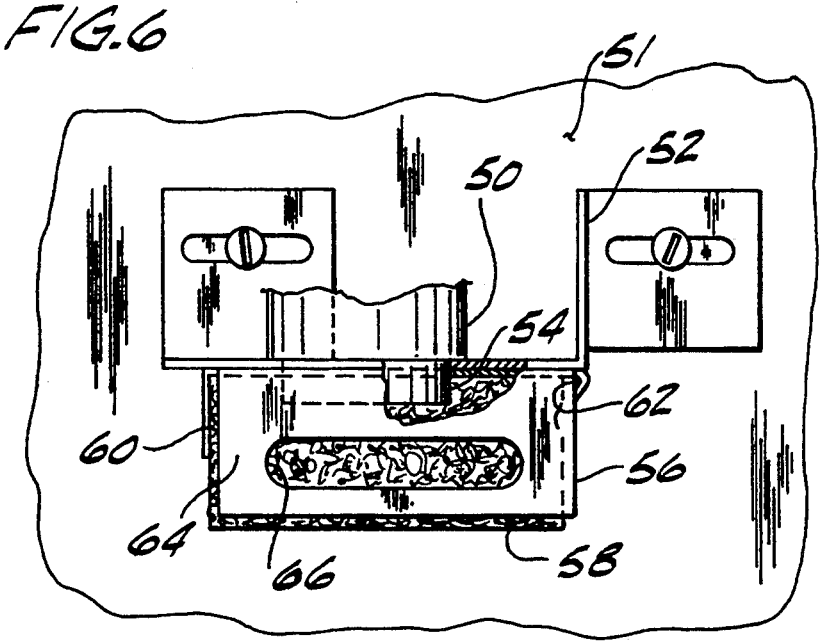
FIG. 6 is a view of the system of FIG. 5 from the right side and partially cutaway to show details of the components thereof.

The end 50 of tube 46 is removably mounted to a bracket 52 secured to the rear wall of the vending machine 10. As best seen in FIGS. 5 and 6, the end 50 of tube 46 is frictionally engaged in a hole formed in the bracket 42 and has a lip 54 which extends beneath the bracket, as shown in FIG. 6.

Secured to the bracket 42, such as by spot welding or the like, is a sheet metal box 56 which is formed to hole a filtering sponge material 58 against the lip 54 of the end 50 of tube 46. The box 56 is formed with an end flat 58 partially covering one end 60 of the filter 58. A smaller end flap 62 on the opposite end of the box 56 from flat 60 is bent inward to slightly deform the end of the filter 58 in order to hold it in place in the box. The side of box 56 adjacent the rear of the cabinet 51 is solid, while the front wall 64 of box 56 has a slot 66 formed therein.

The slot 66 is disposed immediately adjacent the upper rim of the brewing chamber 20, as shown in FIG. 2, so that the maximum suction force is directed across the top of chamber 20 in order to draw the maximum amount of moisture from the chamber as it rises. The bottom of the box 56 is open and a portion 68 of filter 58 protrudes from the lower edges of the box 56 and, as shown in FIG. 2, is spaced from the platen 28.

A substantial amount of the moist coffee grounds drawn up by the suction tube 46 attach themselves to the lower edge 68 of filter 58 and tend to clog the filter substantially in that area. Therefore, a wiper blade 70 is attached such as by bolting or the like to the platen 28 for movement therewith. As shown in FIG. 2, the wiper blade is essentially an L-shaped bracket with an upper edge disposed to engage the lower portion 68 of the filter 58 and to deform it so that the wiper blade comes close to the lower edges of the sides 62 and 64 of the box 56 to thus scrape the residue of moist coffee grounds from the bottom of the filter as the platen moves back and forth during the brewing cycle. The material that is wiped from the filter by the wiper blade 70 is deposited in the waste bucket 44 as the product is dumped from the brewing chamber 20, as described above.

Thus it can be seen, that the suction tube and related filter which are disposed immediately adjacent the top lip of the brewing chamber 20 when it is disposed in its fill position, as shown in FIG. 2, draws most of the moisture and loose coffee grounds into the filter which would otherwise accumulate in the ends of tubes 18 and 24, and thus the present invention substantially reduces any buildup on those tubes which would otherwise require constant service in order to unclog the tubes.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A moisture reduction system for an automatic vending machine of the beverage brewing-type having a brewing chamber mounted for movement between at least a brewing position and a product filling position with an opening through which brewing product is supplied when the brewing chamber is in the filling position, a product storage container and a product delivery conduit for supplying product from the product storage container to the opening in the brewing chamber when the brewing chamber is in the filling position, the system comprising:
   a suction tube having an opening disposed adjacent the opening in the brewing chamber and the product delivery conduit when product is being supplied to the brewing chamber in the filling position,
   a product filter covering the opening in the suction tube, and
   means for creating a suction in the tube sufficient to draw moisture into the suction tube from around the opening in the brewing chamber when product is being supplied thereto.

2. A moisture reduction system as defined in claim 1 including means for removing product from the filter after each brewing cycle of the brewing chamber.

3. A moisture reduction system for an automatic vending machine of the beverage brewing-type having a brewing chamber with an opening through which product is supplied for brewing, a product storage container and a product delivery conduit for supplying product from the product storage container to the opening in the brewing chamber, the system comprising:
   a suction tube having an opening disposed adjacent the opening in the brewing chamber and the product delivery conduit when product is being supplied to the brewing chamber,
   a product filter covering the opening in the suction tube, and means for creating a suction in the tube sufficient to draw moisture into the suction tube from around the opening in the brewing chamber when product is being supplied thereto, wherein the brewing chamber is mounted for movement between a brewing position, a product filling position and a product dumping position and the filter and suction tube openings are disposed adjacent the product fill position.

4. A moisture reduction system as defined in claim 3 including a wiper mounted for movement with the brewing chamber and engaging the filter for part of the wiper movement sufficient to remove product from the filter.

5. A moisture reduction system as defined in claim 2 wherein the means for removing product from the filter includes a wiper mounted for movement with the brewing chamber and engaging the filter for part of the wiper movement sufficient to remove product from the filter.

* * * * *